US012333505B2

(12) United States Patent
Goertz et al.

(10) Patent No.: US 12,333,505 B2
(45) Date of Patent: Jun. 17, 2025

(54) METHOD FOR PAYMENT-BASED EXECUTION OF A FUNCTION OF A FIELD DEVICE TO BE PERFORMED, CORRESPONDING FIELD DEVICE AND SERVICE UNIT

(71) Applicant: KROHNE Messtechnik GmbH, Duisburg (DE)

(72) Inventors: Werner Goertz, Dorsten (DE); Daniel Arndt, Schwalmtal (DE)

( * ) Notice: Subject to any disclaimer, the term of this patent is extended or adjusted under 35 U.S.C. 154(b) by 1078 days.

(21) Appl. No.: 17/223,454

(22) Filed: Apr. 6, 2021

(65) Prior Publication Data

US 2021/0312408 A1 Oct. 7, 2021

(30) Foreign Application Priority Data

Apr. 6, 2020 (DE) ...................... 10 2020 109 537.6

(51) Int. Cl.
| | | |
|---|---|---|
| G06Q 20/04 | (2012.01) | |
| G05B 15/02 | (2006.01) | |
| G06Q 20/38 | (2012.01) | |

(52) U.S. Cl.
CPC ............. *G06Q 20/04* (2013.01); *G05B 15/02* (2013.01); *G06Q 20/3827* (2013.01)

(58) Field of Classification Search
CPC .... G06Q 20/04; G06Q 20/3827; G05B 15/02; G05B 2219/24154; G05B 2219/24165; G05B 2219/25428; G05B 19/0426
See application file for complete search history.

(56) References Cited

U.S. PATENT DOCUMENTS

| | | | |
|---|---|---|---|
| 8,279,038 B2 | 10/2012 | Lefebvre | |
| 11,687,051 B2* | 6/2023 | Garcia | ............... G05B 19/0426 |
| | | | 700/65 |
| 2007/0088488 A1* | 4/2007 | Reeves | .................. G07C 5/085 |
| | | | 701/33.4 |
| 2009/0083444 A1* | 3/2009 | Faist | ......................... G06F 1/14 |
| | | | 709/248 |

(Continued)

FOREIGN PATENT DOCUMENTS

| | | |
|---|---|---|
| DE | 102005053332 A1 | 5/2007 |
| DE | 102013111690 A1 | 5/2015 |

(Continued)

*Primary Examiner* — Radu Andrei
*Assistant Examiner* — Vincent I Idiake
(74) *Attorney, Agent, or Firm* — Patrick D. Duplessis (57) ABSTRACT

A method for execution of a function of a field device includes: selecting a function to be performed from a selection list of functions available to a process control system, and communicating the selected function to a service unit; paying a payment amount specified for the function and confirming the payment to the service unit; determining a derived time value of a service unit and an enable code, and transmitting the enable code to the process control system; forwarding the enable code to the field device; determining a derived time value of the field device, and checking the enable code using the derived time value to determine whether the enable code is generated by the service unit, and determining the function from the enable code; and executing an executable code corresponding to the function in the event the enable code is verified as being generated by the service unit.

18 Claims, 6 Drawing Sheets

(56) References Cited

U.S. PATENT DOCUMENTS

| | | | |
|---|---|---|---|
| 2009/0210077 A1 | 8/2009 | Lefebvre | |
| 2015/0193219 A1* | 7/2015 | Pandya | H04L 67/34 |
| | | | 717/171 |
| 2018/0046162 A1* | 2/2018 | Palatini | G06F 21/44 |
| 2018/0357397 A1 | 12/2018 | Fink et al. | |

FOREIGN PATENT DOCUMENTS

| | | |
|---|---|---|
| DE | 102015121861 A1 | 6/2017 |
| DE | 102016106638 A1 | 10/2017 |

* cited by examiner

METHOD FOR PAYMENT-BASED EXECUTION OF A FUNCTION OF A FIELD DEVICE TO BE PERFORMED, CORRESPONDING FIELD DEVICE AND SERVICE UNIT

TECHNICAL FIELD

The invention relates to a method for payment-based execution of a function of a field device to be performed, wherein the field device has an identifier and wherein the field device is connected to a process control system via a first communication channel. Furthermore, the invention also relates to a field device with a computing unit for executing a function of the field device to be performed and with a communication interface for exchanging data with a process control system. Furthermore, the invention also relates to a service unit with a computing unit and with a time counting device.

BACKGROUND

Such arrangements of—in most cases a plurality of—field devices connect-ed to a process control system, usually via a standardized fieldbus system operating, for example, according to the HART serial protocol via a current interface (4-20 mA interface), have been known for many years, inter alia, from the field of industrial process and automation technology. The field devices are often measuring devices that gather state variables of an industrial process as measured variables and communicate them to other field devices and/or the process control system via the first communication channel. However, the field devices can also be actuators that receive information about manipulated variables via the first communication channel and then act directly as actuators on the process that is to be influenced in the desired way, for example in the form of a regulator. The mentioned identifier of the field device can be its serial number, for example. However, the identifier can also be an identifier assigned during the installation of the field device in its process environment. It is important that the field device can be uniquely identified by its identifier.

For very different reasons, a field device can have functionalities that are not permanently enabled. These may be functionalities that should not be permanently accessible to the regular operator of the field device, i.e., the user, for example for parameterization and diagnosis of the field device. It is also possible that the field device has been purchased from the field device supplier—for example, for cost reasons—only with an enabled basic functionality, but in the course of operation of the field device it has be-come apparent that functionalities that were originally not permanently enabled could now be used advantageously, so that there is a desire to be able to access these functionalities—as needed and possibly only temporarily—and to execute these functionalities on the field device. For example, it may be desired to operate the field device at a higher sampling rate, to retrieve additional sensor information from the field device, and to obtain diagnostic information from the field device, etc.

It is known from the prior art that functionalities not yet executable on the field device are enabled on the field device after payment of a corresponding amount, for example to the provider of the field device. For this purpose, a corresponding activation code is generated, which is transferred to the field device, and which causes the desired and now paid functionality to be available and executed on the field device. For this purpose, it is necessary to connect an operating device to the field device in order to transfer the activation code to the field device. This procedure is time-consuming since appropriate operating personnel must go to the corresponding field device. Since field devices in the application described at the beginning are also permanently installed in a technical process, they are often difficult to access. Furthermore, it must be taken into account that human access to the technical system in which the corresponding field device is installed is undesirable, for example because it is a hazardous area or also an area that falls under operational secrecy. In addition, the functionality acquired by payment in the prior art also cannot be easily deactivated again, so that a time-limited use of the desired functionality is also not possible.

SUMMARY

Thus, it is the object of the present invention to provide a method for the device arrangement described in the introduction, with which it is possible, without direct access to the field device, to perform a functionality on the field device, for example acquired by payment.

The above-described and derived object is initially achieved by the afore-mentioned technical device arrangement in that the process control system is connected to a service unit via a second communication channel and that the field device and the service unit each have at least one-time counting device and wherein the time counting devices are synchronized with one another and each provide a time value of the field device and a time value of the service unit. The time counting devices create the device-related pre-requisite for enabling time-based execution of a desired functionality of the field device. The service unit can, for example, be a data processing system of the supplier of the field device, which is connected to the process control system of the system operator, for example via an internet connection. In industrial practice, the process control system does not necessarily originate from the supplier of the field device under consideration here. Rather, on the basis of standardized communication technologies, in particular through standardization of the first communication channel, field devices from different manufacturers can be operated without collision within the framework of a common process control system. The service unit can then also be implemented as a separate module, for example in terms of software, within the framework of the computer hardware of the process control system, i.e., as a logical function module. It is important to emphasize at this point that no further direct communication link to the field device is required to carry out the method described below, i.e., in contrast to solutions known from the prior art.

In a selection step, the method according to the invention first provides that the process control system selects the function to be executed on the field device from a selection list of executable functions of the field device available to the process control system, and that the process control system communicates the selected function to the service unit. Here, the question of how the process control system obtains knowledge of the selection list of executable functions of the field device is initially disregarded; it is initially assumed that the process control system has this selection list.

It is further provided that, in a payment step, a payment amount specified for the function to be performed is paid by a payment service and the payment of the payment amount is confirmed by the payment service to the service unit by transmission of confirmation information. The payment amount can, for example, be part of the selection list, with a corresponding payment amount being assigned to each selectable function to be performed.

This is followed by a request step in that the service unit determines a derived time value of the service unit dependent on the current time value of the service unit and an enable code dependent on the function to be performed, and transmits the enable code to the process control system. In the simplest case, the derived time value of the service unit, which depends on the current time value of the service unit, is identical to the current time value of the service unit. In advanced variations of the method, cryptographic algorithms are used to derive the derived time value, for example.

In a forwarding step, the process control system then forwards the enable code to the field device. This expresses that no connection to the field de-vice other than the connection that already exists between the field device and the process control system needs to be provided in order to carry out the method. The protected environment of the operator of the field device, which includes the field device and also the process control system, therefore does not have to be changed in terms of the device in order to be able to carry out the method presented here.

The method according to the invention is further characterized in that, in a checking step, the field device determines a derived time value of the field device that is dependent on the current time value of the field device and checks the enable code using the derived time value of the field device to determine whether the enable code is generated by the service unit, and that the field device determines the function to be performed from the enable code.

In that the derived time value of the field device is used to check whether the enable code has been generated by the service unit makes it particularly easy to execute the selected functionality of the field device under precise time constraints (for example, start time, duration and end time). The compliance with temporal boundary conditions during the execution of the selected functionalities of the field device can also be implemented by other means, this does not necessarily depend on the use of the derived time value for determining the enable code.

Finally, it is provided according to the invention, that, in an execution step, in the case where the enable code received from the field device is verified as generated by the service unit, the field device executes an executable code corresponding to the function to be performed.

As stated above, the method according to the invention offers considerable advantages, since for the—temporary— execution of the selected functionality of the field device no connection to the field device has to be established than the one that necessarily already exists between the field device and the process control system.

Furthermore, due to the time reference based on the synchronized time counting devices on the field device on the service unit, it is particularly easy to provide the execution of the selected functionality of the field device with time boundary conditions, so the execution of the selected functionality can also be terminated again, for example after a predetermined—paid—time interval or after a number of executions. With the method it is also possible to deliver a field device practically without any functionality and to enable desired functionalities only in the field, as required.

In a preferred design of the method, it is provided that several selection lists of executable functions of several field devices are stored on the service unit. If the service unit is a database system of the field devices of the supplier, then the service unit can, for example, have all the selection lists of all the field devices of the supplier. In the selection step, the process control system requests the selection list of executable functions of the field device with the identifier SN from the service unit. This is easily possible if each selection list of a field device can be uniquely assigned to the field device with the identifier SN in the service unit, for example by storing the identifier SN of the respective field device. The service unit then provides the process control system with the requested selection list of executable functions of the field device with the identifier SN. In the process control system, the desired function to be executed on the field device is then selected from the selection list of executable functions. Ideally, the selection list also includes corresponding price information for each field device function listed.

Two fundamentally different variations of the general method described above are described in the following. In the first variation, it is necessary that a selection list of executable functions of exactly this field device is stored in the field device itself. In the second variation, which differs from the first variation, such a selection list does not have to be stored on the field device.

According to the design of the method corresponding to the first variation, it is thus provided that the selection list of executable functions of the field device is stored in the field device with the identifier of the field device together with a corresponding description of each individual executable function. The description can be, for example, only a unique identification of the function, the function name with corresponding parameterization or also the function code. The service unit also stores the selection list of executable functions of the field device. In the request step, the service unit compiles the enable code from the current derived time value of the service unit and information about the selected function of the field device.

Since the selection list of executable functions of the field device is stored in the field device, the process control system requests the selection list of executable functions of the field device from the connected field device in the selection step in a further development of the method. The field device then provides the process control system with the requested selection list of executable functions of the field device. In the process control system, the desired function to be executed on the field device is then selected from the selection list of executable functions.

When the enable code compiled in this way is transmitted to the process control system, the process control system basically has the opportunity to check the information contained in the enable code about the selected function to be performed before the enable code is then transmitted by the process control system to the field device via the first communication channel, i.e., the fieldbus system. This can be quite an interesting feature because it gives the user of the field device, and thus the operator of the process control system, immediate control over how the field device in question is affected.

In the checking step, the field device determines a transmitted derived time value of the service unit from the transmitted enable code and the field de-vice further determines the current derived time value of the field device. If the transmitted derived time value of the service unit matches the current derived time value of the field device, the field device verifies the transmit-ted enable code as generated by the service unit.

In the execution step, the field device executes the corresponding executable code of the function to be executed according to the description stored in the field device for the transmitted function to be executed. Depending on the number of executable functionalities on the field device, the selection list of executable functionalities can be very extensive, which must be taken into account when designing the memory equipment of the field de-vice.

An advantageous further development of this method variation is characterized in that the current derived time value on the service unit and the current derived time value on the field device are determined in additional dependence on field device-specific information for the function to be executed. The information for the function to be executed basically allows for distinguishing the executable functions on a field device from each other. However, because the information is also field device-specific, the information for the executable functions is also different for identical functions on different field devices. Thus, the field device-specific information is actually field device- and function-specific information; this understanding always underlies the use of the term field device-specific information.

This measure provides an additional degree of manipulation security because the derived time value is now dependent on the synchronized time value and the selected function of the field device, which is characterized by the device-specific information. It is thus not possible for the process control system to manipulate an enable code in such a way that it could successfully enable a functionality (with the corresponding device-specific information) acquired for only one specific field device in different connected field devices. Furthermore, an additional degree of manipulation security is also obtained because the derived time value is also dependent on the synchronized time value of the field device. It is not possible for the process control system to manipulate an enable code by exchanging a pure (derived) time information in such a way that it could successfully enable the functionality of the field device, which was acquired only once, in the connected field device several times, i.e., at the times with correspondingly manipulated (derived) time values.

In order to implement this additional manipulation security, it is preferably provided that the selection list of executable functions of the field device with the identifier SN comprises the field device-specific information for the executable functions. Alternatively, the field device-specific information for the executable functions can be determined from the respective description of the executable function and the field device identifier of the field device.

The executable code corresponding to the description of the function to be performed stored in the field device can be determined in various ways. According to a further development of the method, it is provided that the executable code of the function to be performed is itself stored in the field device as a description of the function to be performed. According to an alternative further development of the method, it is provided that the executable code of the function to be performed is generated from the description of the function to be performed in the field device. For this purpose, the de-scription comprises at least one of the following: type of function, time period of executability of the function, prevalence of executability of the function, frequency of executability of the function, resolution of the output value of the function.

According to the design of the method corresponding to the second variation—the field device need not have a selection list of executable functionalities—it is provided that, in the request step, the service unit determines the executable code corresponding to the function to be performed from the information about the function to be performed. The executable code may be at least one appropriately parameterized function cue, with the at least one function itself already implemented in the field device. However, it is also conceivable that even the programming implementation of the selected functionality is transmitted as executable code; this may be a high-level language implementation of the selected functionality that still has to be translated or interpreted accordingly in the received field device, but it could also be a directly executable binary code. Since the selected functionality is transmitted to the field device as executable code, the field device does not need to know about all functionalities that can basically be selected, which is why a selection list does not need to be stored on the field device—as already indicated above. This is associated with a lower memory requirement; depending on the size of the selection list, the memory requirement can also be quite considerably lower with this variation of the method presented.

The service unit determines a hash value from the executable code. Then the service unit determines the enable code from the executable code and the hash value from the executable code, wherein at least the hash value or the executable code is encrypted by the service unit with the current de-rived time value of the service unit as a symmetric key.

A preferred further development of this method variation, which has increased manipulation security, provides that the current derived time value on the service unit and the current derived time value on the field device are determined in additional dependence on the field device identifier of the field device. This means that it is no longer possible for the process control system, for example, to manipulate an enable code once it has been acquired in such a way that it can also be used for other field devices.

According to one embodiment, it is provided that the enable code on the service unit is compiled from the executable code and from the hash value encrypted with the current derived time value of the service unit as a symmetric key. Here, too, it is possible for the process control system to check the enable code to be transmitted to the field device beforehand for the functionality it contains, so that the process control system also has full control, in this case, over how the field device in question is influenced when the enable code is transmitted. The system operator therefore does not have to trust that the enable code received corresponds to the previously selected functionality; rather, he can check the correspondence himself.

In the checking step, the field device decrypts the encrypted part of the received enable code using the current derived time value of the field device as the corresponding symmetric key. The field device then compares the hash value obtained from the decryption and determined on the service unit with a hash value determined by the field device from the executable code received with the enable code. If the hash values match, the field device verifies the transmitted enable code as generated by the service unit. Finally, in the execution step, the field device executes the received executable code.

An alternative design of the second variation of the method is characterized in that the enable code on the service unit is composed of the pair of values from the executable code encrypted with the current derived time value of the service unit as a symmetric key and the hash value from the executable code.

In the checking step, the field device decrypts the received enable code using the current derived time value of the field device as the corresponding symmetric key. The field device then compares the hash value obtained from the decryption and determined on the service unit with a hash value determined by the field device from the executable code received with the enable code. If the hash values match, it is considered verified that the transmitted enable code has been generated by the service unit, and the field device executes the received executable code in the execution step.

In a further advantageous design of the method, applicable to all variations described, the derived time value from the service unit dependent on the current time value of the service unit and the derived time value from the field device dependent on the current time value of the field device are calculated by means of a cryptographic hash function using a secret key agreed upon between the field device and the service unit.

An advantageous further development of the method, which is also applicable to all method variations, is characterized in that, in the event that in the checking step a generation of the transmitted enable code by the service unit cannot be verified by the field device using the current derived time value of the field device, the field device uses at least one preceding time value and the preceding time value derived therefrom for verification and/or the field device uses at least one future time value and the future time value derived therefrom for verification of the generation of the transmitted enable code by the service unit. If the verification of the generation of the transmitted enable code by the service unit with a past or future derived time value is successful, the verification is deemed valid.

In the aforementioned context, it has been found useful if the time deviation between the current derived time value and the past or future derived time value leading to successful verification is used to correct the time counting device of the field device for synchronization with the time counting device of the service unit.

A further development of the method enables the triggering of a function of the field device at a future time. For this, the process control system informs the service unit, in the selection step, not only of the selected function but also of a future validity time. The service unit calculates a future current time value from the current time value of its time counting device and the time difference to the future validity time. This future current time value is used by the service unit to determine the enable code as the current time value. In the field device, the enable code is verified as generated by the service unit only when the current time value of the time counting device of the field device corresponds to the aforementioned future validity time.

In one design of the method, with respect to the payment service, it is provided that the payment service is implemented on the process control system and/or on the service unit and/or as a separate instance communicating with the process control system and/or with the service unit. The payment service need not be provided by a commercial entity authorized to provide banking services. Rather, the payment service may be a functionality that identifies which functionalities of a field device have been requested to be performed and by whom. This may, for example, be noted in a customer account assigned to the respective user and then later billed according to an agreed payment modality. The mere noting of the entry of the payment amount in the corresponding customer account can then be considered as a payment made and trigger the transmission of the confirmation information. Accordingly, the payment service can be operated, for example, as part of the process control system. Part of the payment service may also be operated on the service unit, such that the service unit debits the required payment amount from an account maintained on the process control system of the user of the field device.

The derived object is achieved in the field device mentioned at the beginning with a computing unit for executing a function of the field device to be performed and with a communication interface for data exchange with a process control system in that the field device has at least one time counting device which provides a time value of the field device and that the computing unit is programmed such that the field device can execute the steps of the method described above relating to the field device and also executes them during operation of the field device, in particular during the checking step and the execution step. In one design of the field device, it is provided that the time counting device of the field device is designed to be tamper-proof, which prevents a function of the field device that is enabled at a particular time from being activated a number of times by resetting the time counting device of the field device. For this, it can be provided, for example, that the influencing of the time counting device of the field device is not provided or is discarded as impermissible unless additional boundary conditions are fulfilled, such as that successive influencing of the time counting device of the field device is only possible after a predetermined period of time (for example, after one hour or after one day) or only a certain number of influences of the time counting device are possible within a certain time interval (for example, three influences per year).

Furthermore, the derived object is achieved in the case of the service unit mentioned at the beginning with a computing unit and with a time counting device in that the time counting device provides a time value of the service unit and that the computing unit is programmed such that the service unit can execute the steps of the method described above relating to the service unit and also executes them during operation of the service unit, in particular during the request step.

BRIEF DESCRIPTION OF THE DRAWINGS

In detail, there is now a plurality of possibilities for designing and further developing the method according to the invention, the field device according to the invention and the system according to the invention. For this, reference is made to the following description of embodiments in conjunction with the drawings.

DETAILED DESCRIPTION

Figure 1:
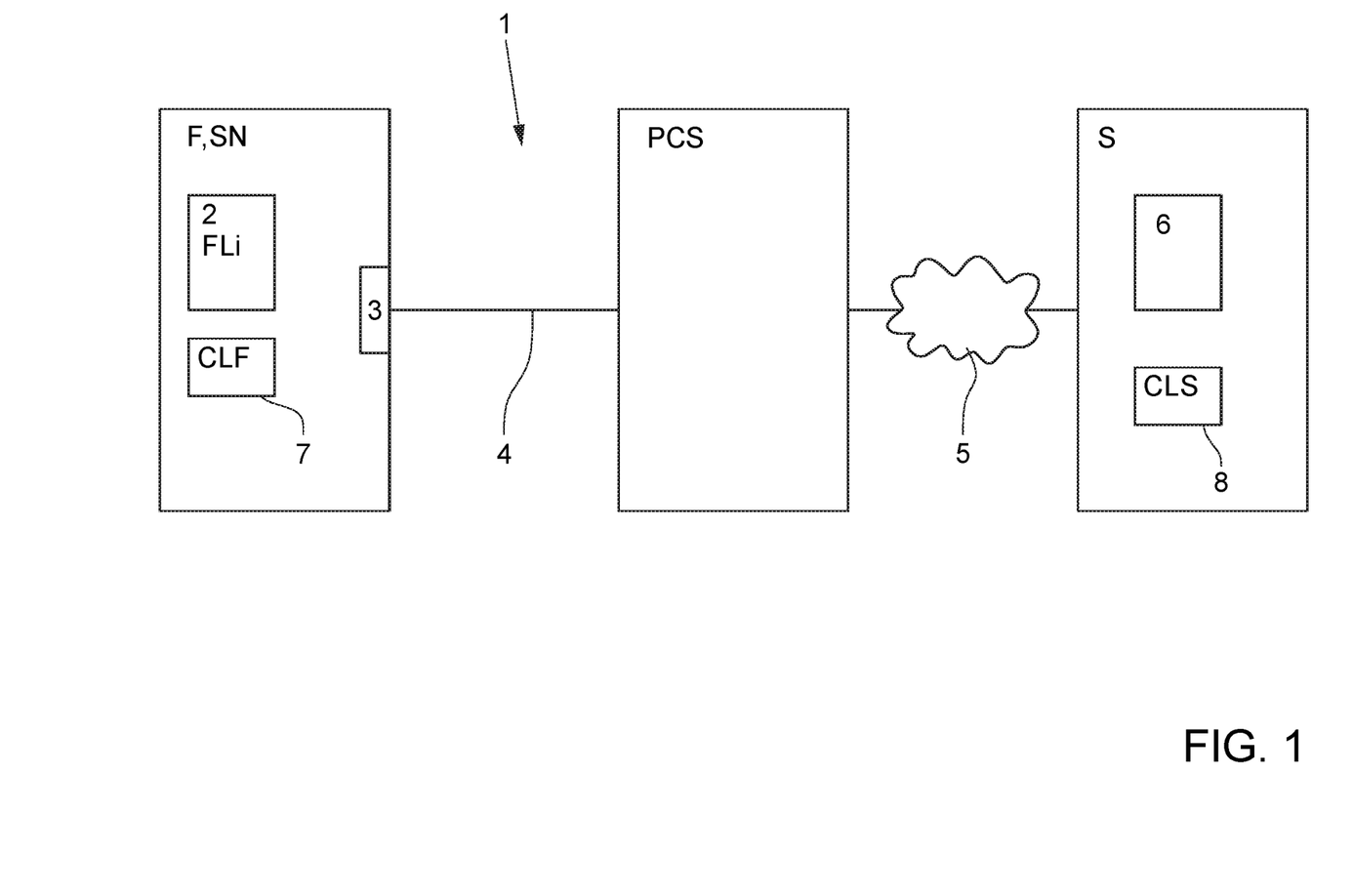
FIG. 1 schematically illustrates the device structure for carrying out the method for the payment-based execution of a function of a field device to be carried out.

In each of FIGS. 1 to 6, a method 1 for payment-based execution of a function FLi of a field device F to be performed is illustrated, wherein the field device F has an identifier SN. The field device F is connected to a process control system PCS via a first communication channel 4. FIG. 1 shows the basic device arrangement required to be able to carry out the aforementioned process 1. The field device F here has an identifier SN in the form of a serial number which uniquely identifies the device. The field device F has a computing unit 2 for executing a function FLi of the field device F to be performed. The field device F also has a communication interface 3, which in this case is a field bus interface, in this case according to the HART protocol. The field device F interacts with a technical process not shown here. By means of the communication interface 3, the field device F is connected to the process control system PCS via the first communication channel 4. In common applications, a large number of field devices F are connected to the process control system PCS via a field bus system.

The method for the payment-based execution of a function FLi of the field device F to be performed, illustrated below in particular with reference to FIGS. 2 to 6, enables the execution of a function FLi of the field device F on an as-needed and intermittent basis without an additional device having to make direct contact with the field device F, which is required by the state of the art, for example in order to transfer an enable code for the relevant function FLi of the field device F into the field device F.

For this, the process control system PCS is connected to a service unit S via a second communication channel 5. The service unit S is a database system of the supplier of the field device F. The service unit S also has a computing unit 6 that is programmed accordingly to implement the functionality described below. The second communication channel 5 is internet-based. The field device F and the service unit S each have a time counting device 7, 8, wherein the time counting devices 7, 8 are synchronized with each other and each provide a time value CLF of the field device F and a time value CLS of the service unit S.

The basic principle of all the methods 1 illustrated in FIGS. 2 to 6 will now be explained with reference to FIG. 2. The various communication partners, namely the field device F, the process control system PCS, the service unit S and a payment service PAY to be explained in more detail, are shown here as vertical lines in the manner of a sequence diagram. The arrows between the vertical lines indicate which information is exchanged between the communication partners.

In a selection step 9, the process control system PCS selects the function FLi(SN) to be executed on the field device F from a selection list of executable functions FL(SN) of the field device F available to the process control system PCS. The process control system PCS then communicates the selected function FLi(SN) to the service unit S. The selection of the function FL(SN) to be performed is made according to the needs of the operator of the system to which the field device F belongs. For this reason, it makes sense that the selection step 9 is applicably localized in the process control system PCS.

In a payment step 10, a payment amount predetermined for the function FLi(SN) to be performed is paid by a payment service PAY, and the payment of the payment amount is confirmed by the payment service PAY to the service unit S by transmitting confirmation information PAID(FLi(SN)). In FIGS. 2 to 6, the payment step 10 is indicated by two dashed horizontal lines, and the payment service PAY is indicated by a separate vertical line for clarity. This is to indicate that the functionality of the payment service PAY can also be located in the process control system PCS and/or the service unit S.

In a request step 11, the service unit S determines a derived time value CLS' of the service unit S dependent on the current time value CLS of the service unit S and an enable code FC dependent on the function FLi(SN) to be performed. The service unit S transmits the enable code FC to the process control system PCS.

In a forwarding step 12, the process control system PCS then forwards the enable code FC to the field device F.

Figure 2:
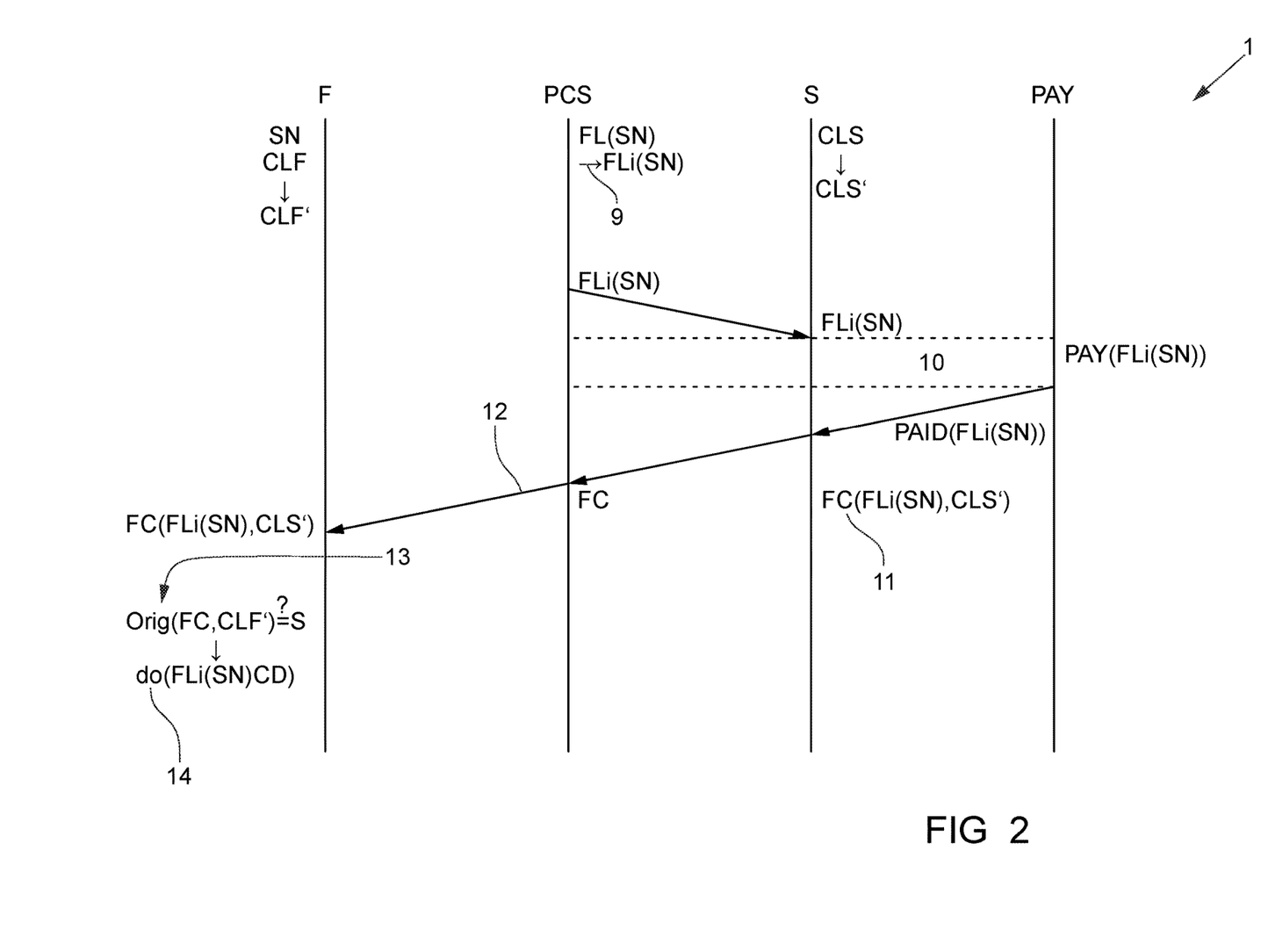
FIG. 2 schematically illustrates the interaction between the field device, the process control system, the service unit and the payment service in the manner of a sequence diagram in a general embodiment.

In a checking step 13, the field device F determines a derived time value CLF' of the field device F that depends on the current time value CLF of the field device F, and the field device F checks the enable code FC using the derived time value CLF' of the field device F to determine whether the enable code FC is generated by the service unit S (this is indicated in FIG. 2 by the pseudo code "Orig(FC, CLF') ?=S"). Furthermore, the field device F determines the function FLi(SN) to be performed from the enable code FC.

In an execution step 14, in case the enable code FC received by the field device F is verified as generated by the service unit S, the field device F executes an executable code FLi(SN)CD corresponding to the function FLi(SN) to be performed (this is indicated in FIG. 2 by the pseudo code "do(FLi(SN)CD)").

The advantage of the method described here with reference to FIG. 2 is that the processing of the payment and the generation of an enable code FC, as well as the transmission of the enable code FC into the field device F, are fully implemented without contacting the field device via an additional communication channel. Due to the generation of the enable code FC using (derived) time information, the enable code functions only with a time limit based on its time reference. A renewed transmission of the enable code from the process control system to the field device is therefore ineffective.

Figure 3:
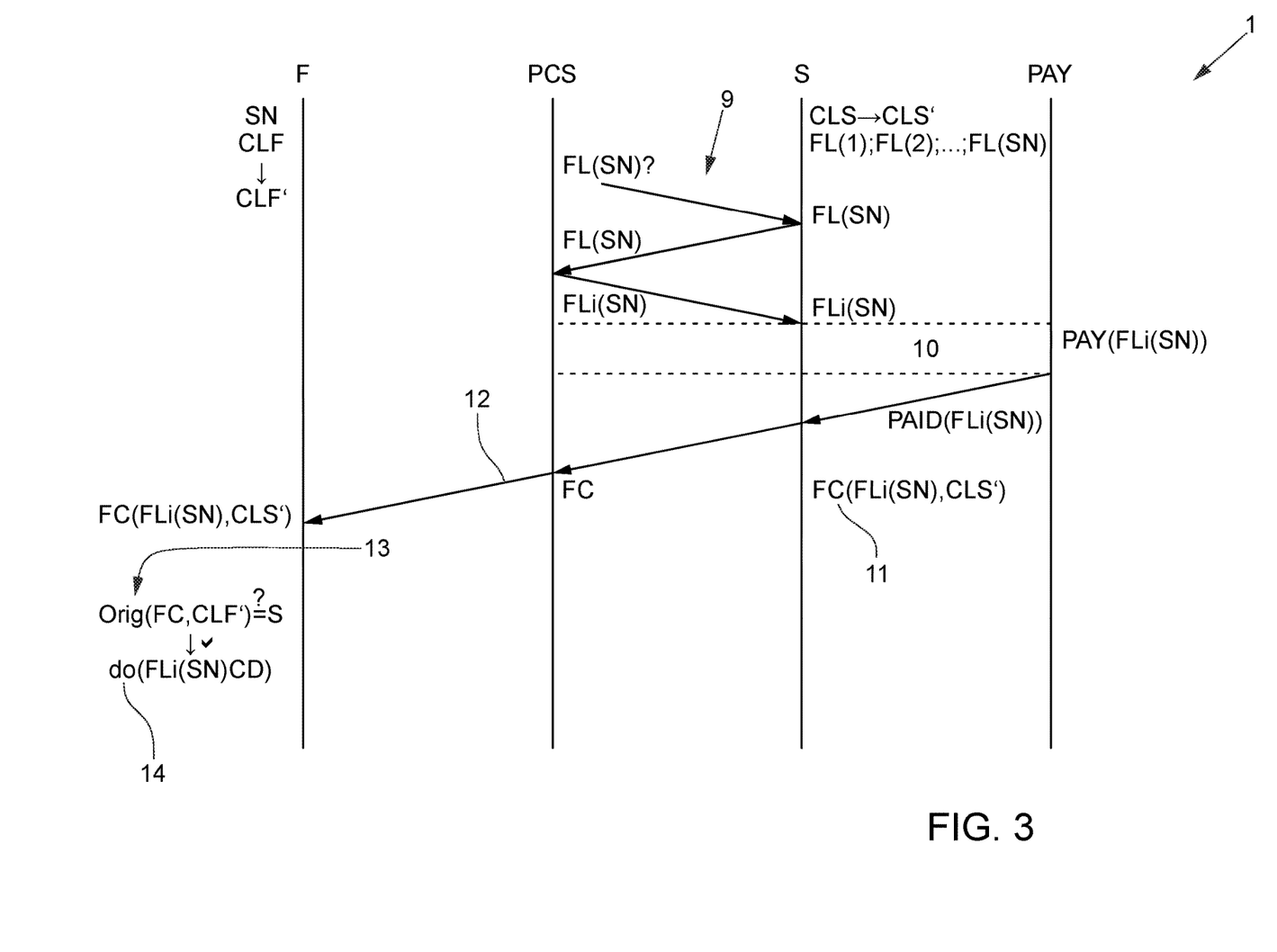
FIG. 3 illustrates the embodiment according to FIG. 2 with an addition regarding the communication between the process control system and the service unit.

The method according to FIG. 3 essentially corresponds to the method shown in FIG. 2, but it is additionally explained here how the process control system PCS comes to know the selection list FLi(SN) of the field device F with the identifier SN. Several selection lists of executable functions FL(SN) of several field devices F are stored in the service unit S, ideally all selection lists of all field devices of the supplier of the field devices are stored in the service unit S. In the selection step 9, the process control system PCS requests from the service unit S the selection list of executable functions FL(SN) of the field device F with the identifier SN. The service unit S then provides the process control system PCS with the requested selection list of executable functions FL(SN) of the field device F with the identifier SN. In the process control system PCS, the function FLi(SN) to be executed on the field device F is then selected from the selection list of executable functions FL(SN). In the present case, the selection list of executable functions FL(SN) also includes corresponding price information for the execution of the functions of the field device F listed in the selection list.

Figure 4:
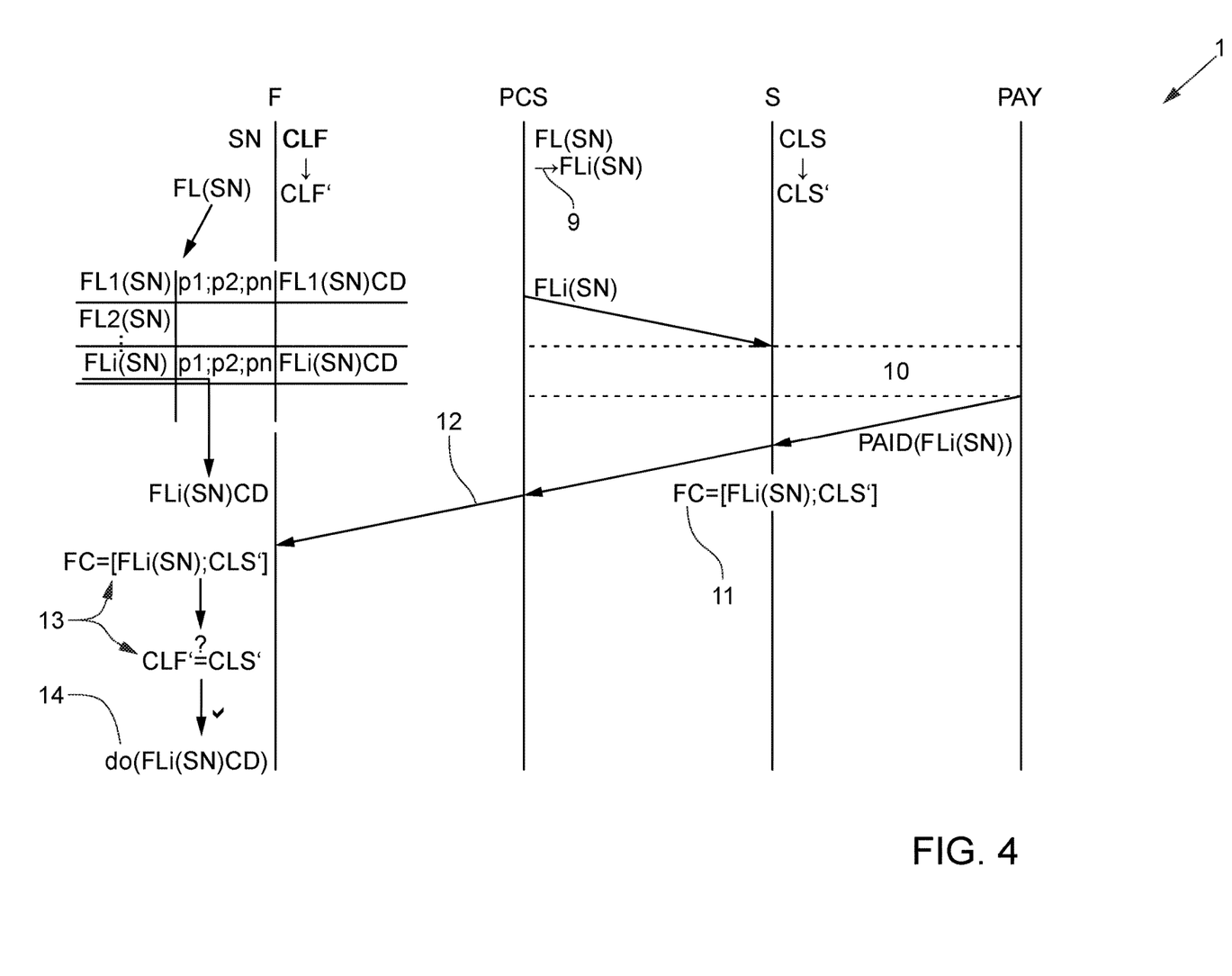
FIG. 4 schematically illustrates the interaction between the field device, the process control system, the service unit and the payment service in the manner of a sequence diagram in an embodiment using a selection list on the field device.

FIG. 4 shows an embodiment of the method 1 in which it is assumed that the field device F itself has a complete list of functions FL(SN) that are executable on it. Accordingly, the selection list of executable functions FL(SN) of the field device F is stored in the field device F with the identifier SN, together with a corresponding description p1, p2, . . . , pn of each individual executable function FLi(SN). As already explained in the general embodiment, the service unit S also stores the selection list of executable functions FL(SN) of the field device F.

In the request step 11, the service unit S compiles the enable code FC=[FLi(SN); CLS'] from the current derived time value CLS' of the service unit S and from information about the selected functions FLi(SN) of the field device F. In the checking step 13, the field device F determines a transmitted derived time value CLS' of the service unit S and the current derived time value CLF' of the field device F from the transmitted enable code FC. If the transmitted derived time value CLS' of the service unit S matches the current derived time value CLF' of the field device F, the transmitted enable code FC is verified as having been generated by the service unit S.

In execution step 14, the field device F executes the corresponding executable code FLi(SN)CD of the function FLi(SN) to be executed according to the description stored in the field device F for the transmitted function FLi(SN) to be executed.

The list of functions FL(SN) executable on the field device F stored in the field device F indicates two different possibilities for implementing the descriptions of the corresponding functions. One variation is characterized in that the executable code FL1(SN)CD, FLi(SN)CD of the function FL1(SN), FLi(SN) to be performed, itself is stored in the field device F as a description of the function FLi(SN) to be performed. In the other variation, the executable code FLi(SN)CD of the function FLi(SN) to be performed is generated from the description p1, p2, p3 of the function FLi(SN) to be performed in the field device F. In this case, the description p1, p2, p3 includes at least one of the following: type of function, time period of executability of the function, prevalence of executability of the function, frequency of executability of the function, resolution of the output value of the function. It is considered advantageous in this variation of the method 1 that the enable code transmits the selected function FLi to be performed without encryption, so that the process control system PCS has a possibility to check whether the selected function FLi(SN) to be performed transmitted to the field device corresponds to the function actually selected beforehand.

The embodiment of the method 1 according to FIG. 4 is further characterized in that the current derived time value CLS' on the service unit S and the current derived time value CLF' on the field device F are determined in additional dependence on field device-specific information for the function FLi(SN) to be performed. In the present case, the selection list of executable functions FL(SN) of the field device F with the identifier SN includes the field device-specific information for the executable functions FL(SN), which is not shown in detail but is easily understandable. All in all, this achieves an increased degree of manipulation security The methods 1 illustrated in FIGS. 5 and 6 do not require a selection list of executable functions FL(SN) stored in the field device F. For this, in the request step 11, the service unit(S) determines the executable code FLi(SN)CD corresponding to the function FLi(SN) to be performed from the information about the function FLi(SN) to be performed. The service unit S further determines a hash value $Hash_S$ (FLi(SN)CD) from the executable code (FLi(SN)CD). Finally, the service unit S determines the enable code FC from the executable code FLi(SN)CD and the hash value $Hash_S$(FLi(SN)CD) from the executable code FLi(SN)CD, wherein at least the hash value $Hash_S$(FLi(SN)CD) is encrypted by the service unit S with the current derived time value CLS' of the service unit S as a symmetric key.

Figure 5:
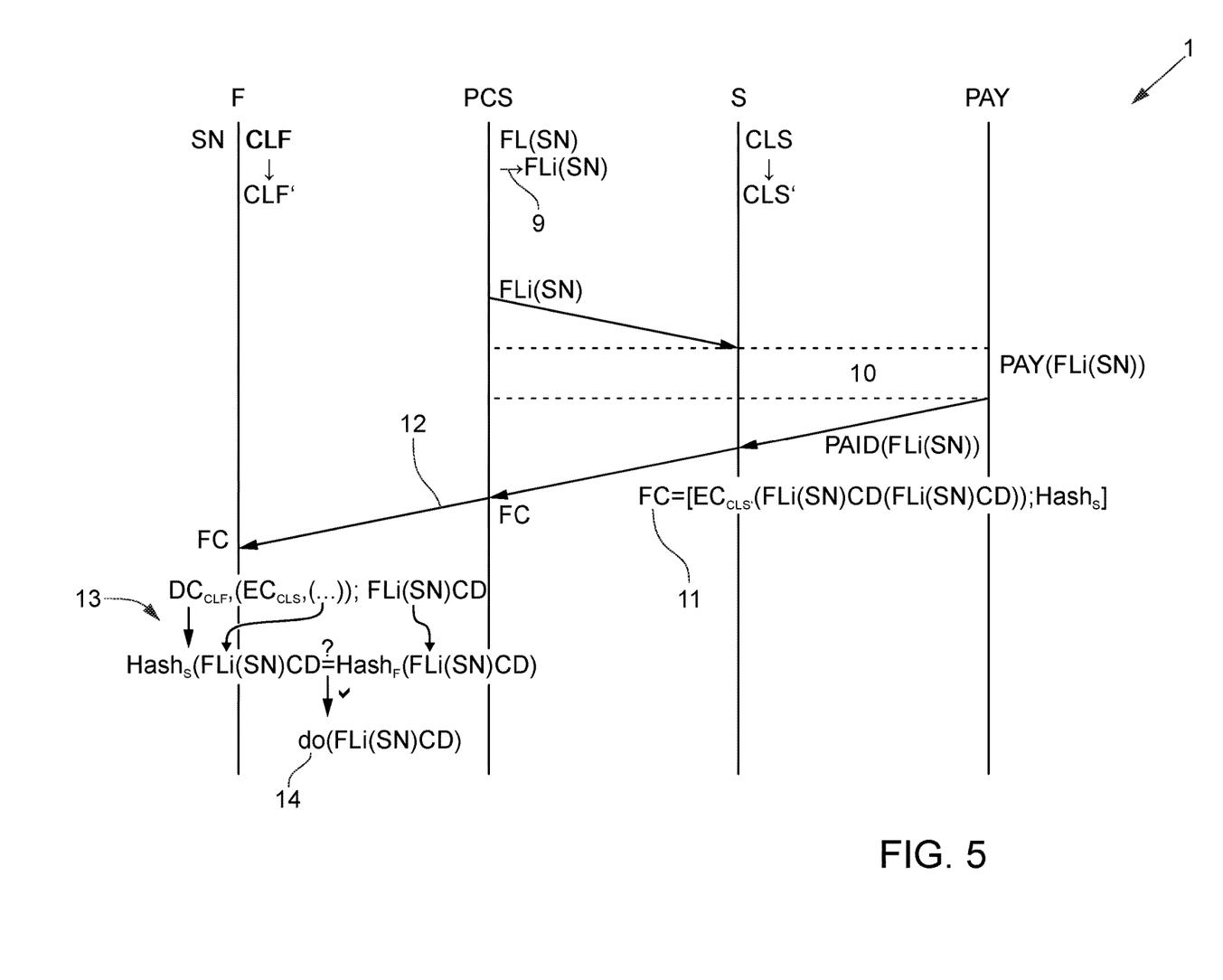
FIG. 5 schematically illustrates the interaction between the field device, the process control system, the service unit and the payment service in the manner of a sequence diagram in an embodiment using a transmitted executable code according to a first variation.
Figure 6:
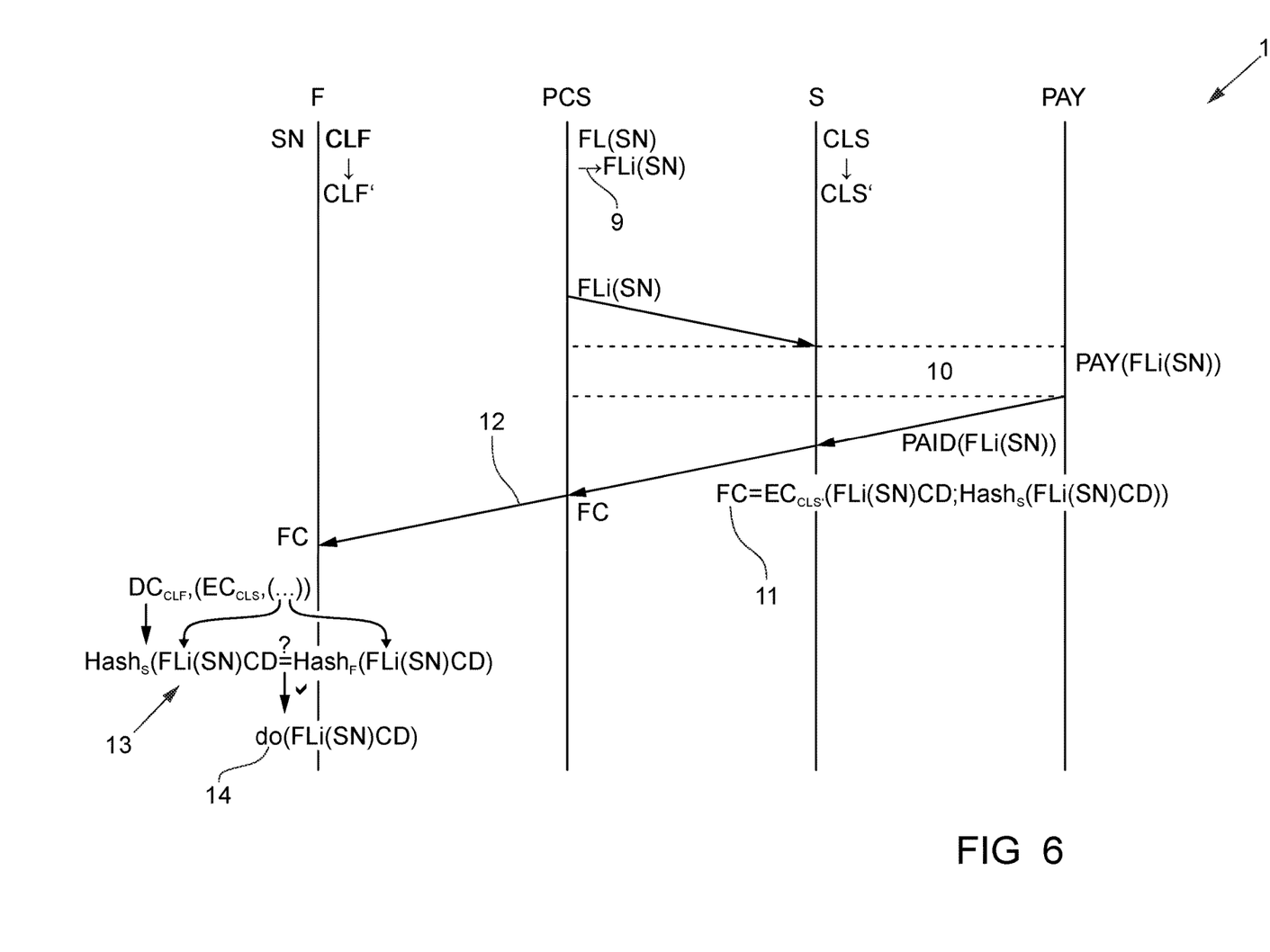
FIG. 6 schematically illustrates the interaction between the field device, the process control system, the service unit and the payment service in the manner of a sequence diagram in an embodiment using a transmitted executable code according to a second variation.

In addition, it is implemented in the presented methods that the current derived time value CLS' on the service unit S and the current derived time value CLF' on the field device F are determined in additional dependence on a unique identifier of the field device F, wherein here the field device identifier SN of the field device F is used as unique identifier of the field device F.

It is also conceivable to use the unique identifier of the field device F as the symmetric key instead of the derived time value CLS' of the service unit S, since this is present both in the service unit S and in the field device F. However, the method would then be vulnerable to replay attacks by the process control system PCS.

The embodiment of method 1 shown in FIG. 5 is characterized in that the enable code FC on the service unit S is composed of the executable code FLi(SN)CD and of the hash value $Hash_S$(FLi(SN)CD)) encrypted with the current derived time value CLS' of the service unit S as symmetric key, so that the following results as enable code:

$$FC=[FLi(SN)CD; EC_{CLS'}(Hash_S(FLi(SN)CD))].$$

This variation of the method 1 also has the advantage that the enable code contains an unencrypted reference to the function FLi(SN) to be performed, in this case in the form of the corresponding executable code. In any case, the process control system also has the possibility, in this case, to check the enable code FC transmitted to the field device F to see whether it contains the function FLi(SN) actually selected.

In the checking step 13, the field device F decrypts the encrypted part $EC_{CLS'}$(Hash$_S$(FLi(SN)CD)) of the received enable code FC with the current derived time value CLF' of the field device F as the corresponding symmetric key $DC_{CLF'}(EC_{CLS'})$. The field device F then compares the hash value Hash$_S$(FLi(SN)CD) obtained from the decryption and determined on the service unit S with a hash value Hash$_F$(FLi(SN)CD) determined by the field device F from the executable code FLi(SN)CD received with the enable code FC. If the hash values Hash$_S$, Hash$_F$ match, the field device F verifies the transmitted enable code FC as having been generated by the service unit S. In this case, the field device F executes the received executable code FLi(SN)CD from (do(FLi(SN)CD)) in the execution step 14.

The variation of the method 1 shown in FIG. 6 is characterized in that the enable code FC on the service unit S is composed of the value pair [Hash$_S$(FLi(SN)CD); FLi(SN)CD] from the executable code FLi(SN)CD encrypted with the current derived time value CLS' of the service unit S as a symmetric key, so that as a result the enable code is:

$$FC=EC_{CLS'}[FLi(SN)CD; Hash_S(FLi(SN)CD)].$$

In the checking step 13, the field device F decrypts the received enable code FC using the current derived time value CLF' of the field device F as the corresponding symmetric key DCCLF'(FC). The field device F compares the hash value Hash$_S$(FLi(SN)CD) obtained from the decryption and determined on the service unit S with a hash value $Hash_F(FLi(SN)CD)$ determined by the field device F from the executable code FLi(SN)CD received with the enable code (FC). If the hash values $Hash_S$, $Hash_F$ match, the field device F verifies the transmitted enable code FC as having been generated by the service unit S. In this case, the field device F in turn executes the received executable code FLi(SN)CD in the execution step 14.

In the embodiments of the method 1 shown in FIGS. 2 to 6, it is implemented that the derived time value CLS' dependent on the current time value CLS of the service unit S is calculated by the service unit S and the derived time value CLF' dependent on the current time value CLF of the field device F is calculated by the field device F with a cryptographic hash function using at least one secret key agreed upon between the field device F and the service unit S.

In the embodiments shown in FIGS. 2 to 6, it is also implemented that in the event that, in the checking step 13, a generation of the transmitted enable code FC by the service unit S cannot be verified by the field device F using the current derived time value CLF' of the field device F, the field device uses at least one previous time value CLF and the previous time value CLF' derived therefrom for verification and/or the field device uses at least one future time value CLF and the future time value CLF' derived therefrom for verification of the generation of the transmitted enable code FC by the service unit S, and if verification of the generation of the transmitted enable code FC by the service unit S with a past or future derived time value CLF' is successful, the verification is deemed valid. This measure allows for the method to be used even if the time counting devices 7,8 on the field device and on the service unit have diverged slightly, for example, with increasing operating time.

This procedure also offers the advantage that the time deviation between the current derived time value CLF' and the past or future derived time value CLF' leading to successful verification is used to correct the time counting device 7 of the field device F for synchronization with the time counting device 8 of the service unit S.

The invention claimed is:

1. A method for payment-based execution of a function of a field device to be performed, wherein the field device has an identifier and is connected to a process control system via a first communication channel, the process control system is connected to a service unit via a second communication channel, the field device and the service unit each have at least one time-counting device, and the time-counting devices are synchronized to provide a current field device time value for the field device and a current service unit time value for the service unit, the method comprising:
    selecting, by the process control system, a selected function to be performed on the field device from a selection list of executable functions of the field device available to the process control system, wherein the selected function to be performed includes a payment amount;
    transmitting, from the process control system to the service unit, the selected function to be performed;
    receiving, at the service unit from a payment service, a payment confirmation of the payment amount for the selected function to be performed;
    determining, by the service unit, a derived service unit time value and an enable code, wherein the derived service unit time value is dependent on the current service unit time value and wherein the enable code is dependent on the selected function to be performed;
    transmitting the enable code from the service unit to the process control system;
    transmitting the enable code from the process control system to the field device;
    determining, at the field device, a derived field device time value, wherein the derived field device time value is dependent on the current field device time value;
    determining, at the field device and using the derived field device time value, that the enable code is generated by the service unit;
    determining, at the field device, the selected function to be performed from the enable code; and
    in response to determining the enable code is generated by the service unit, executing, at the field device, an executable code corresponding to the selected function to be performed.

2. The method according to claim 1, wherein a plurality of lists of executable functions corresponding to a plurality of field devices are stored on the service unit, and further comprising:
    prior to selecting the selected function to be performed, receiving, at the process control system from the field device, a field device identifier corresponding to the field device;
    requesting, by the process control system from the service unit, a list of executable functions corresponding to the field device identifier from the plurality of lists of executable functions; and
    transmitting, from the service unit to the process control system, the list of executable functions corresponding to the field device identifier to be used as the selection list of executable functions.

3. The method according to claim 1, wherein the selection list of executable functions of the field device is stored in the field device together with a corresponding description of each individual executable function;
    wherein the selection list of executable functions of the field device is stored in the service unit;
    wherein the enable code is determined by compiling the derived service unit time value and information about the selected function to be performed;
    wherein determining the enable code is generated by the service unit further comprises:
        determining a transmitted derived time value of the service unit from the enable code;
        determining the current field device time value; and
        determining the transmitted derived time value of the service unit matches the derived field device time value; and
    wherein executing the executable code corresponding to the selected function to be performed in accordance with a description stored in the field device for the selected function to be performed.

4. The method according to claim 3, wherein the selection list of executable functions of the field device includes field device-specific information for the executable functions or the field device-specific information for the executable functions is determined from the corresponding description of the executable functions;
    wherein the derived service unit time value and the derived field device time value are determined in additional dependence on the field device-specific information for the selected function to be performed.

5. The method according to claim 3, wherein the executable code corresponding to the selected function to be performed is stored in a corresponding description of executable functions in the field device; or wherein the executable code of the selected function to be performed is generated from the corresponding description of executable functions in the field device, and the corresponding description comprises at least one of the following: type of function, time period of executability of the function, prevalence of executability of the function, frequency of executability of the function, resolution of an output value of the function.

6. The method according to claim 1, wherein determining the enable code further comprises:
determining the executable code corresponding to the selected function to be performed from information about the function to be performed;
determining a hash value from the executable code; and
determining the enable code from the executable code and the hash value, wherein at least the hash value or the executable code is encrypted by the service unit with the derived service unit time value as a symmetric key.

7. The method according to claim 6, wherein the derived service unit time value and the derived field device time value are determined in additional dependence on a field device identifier of the field device.

8. The method according to claim 6, wherein the enable code on the service unit is composed of the executable code and of the hash value encrypted with the derived service unit time value as the symmetric key.

9. The method according to claim 8, wherein determining the enable code is generated by the service unit further comprises:
determining a decrypted hash value by decrypting the enable code using the derived field device time value as the as a corresponding symmetric key;
determining a derived hash value from the executable code that is part of the enable code; and
determining the decrypted hash value corresponds with the derived hash value.

10. The method according to claim 6, wherein the enable code on the service unit is compiled from a value pair encrypted with the derived service unit time value as the symmetric key and the hash value from the executable code.

11. The method according to claim 10, wherein determining the enable code is generated by the service unit further comprises:
determining a decrypted hash value by decrypting the enable code using the derived field device time value as a corresponding symmetric key;
determining a derived hash value from the executable code that is part of the enable code; and
determining the decrypted hash value corresponds with the derived hash value.

12. The method according to claim 1, wherein the derived service unit time value dependent on the current service unit time value is calculated by the service unit and the derived field device time value dependent on the current field device time value is calculated by the field device, both with a cryptographic hash function using a secret key agreed upon between the field device and the service unit.

13. The method according to claim 1, wherein in the event that the field device does not determine the enable code is generated by the service unit using the derived field device time value, the field device uses at least one preceding field device time value as the derived field device time value to determine whether the enable code is generated by the service unit and/or the field device uses at least one future field device time value as the derived field device time value to determine whether the enable code is generated by the service unit, and if verification of the generation of the enable code by the service unit with a preceding or future field device time value is successful, the verification is evaluated as valid.

14. The method according to claim 13, wherein a time deviation between the derived field device time value and the preceding or future field device time value leading to successful verification is used to correct the time-counting device of the field device for synchronization with the time-counting device of the service unit.

15. The method according to claim 1, wherein transmitting the selected function to be performed further comprises transmitting, from the process control system to the service unit, a future validity time; and
wherein derived service unit time is based on a future current time value that is calculated from the current service unit time value of the service unit time-counting device and a time difference between the current service unit time value and the future validity time.

16. The method according to claim 1, wherein the payment service is implemented on the process control system or on the service unit or as a separate instance that communicates with the process control system and/or with the service unit.

17. A field device with a computing unit for executing a functions of the field device, with a communication interface for exchanging data with a process control system, wherein the field device has at least one time-counting device which provides a time value of the field device; and
wherein the computing unit is programmed such that the field device can execute a method relating to the field device, comprising:
receiving an enable code from the process control system, the enable code which is dependent on a function to be performed;
determining a derived time value of the field device which is dependent on a current time value of the field device;
determining, using the derived time value, that the enable code is generated by a service unit;
determining the function to be performed from the enable code; and
in response to determining the enable code is generated by the service unit, executing an executable code corresponding to the function to be performed.

18. A service unit with a computing unit and with a time-counting device, wherein the time-counting device provides a time value of the service unit; and
wherein the computing unit is programmed such that the service unit can execute a method comprising:
receiving, from a payment service, a payment confirmation corresponding to a payment amount specified for a function to be performed;
determining a derived time value of the service unit and an enable code, wherein the derived time value is dependent on a current time value provided by the time-counting device of the service unit, and wherein the enable code is dependent on the function to be performed; and
transmitting the enable code to a process control system.

* * * * *